April 9, 1968     L. A. HERNÁNDEZ, JR     3,376,652
LOW TEMPERATURE FREEZE DRYING PROCESS
AND APPARATUS THEREFOR
Filed June 17, 1966     2 Sheets-Sheet 2
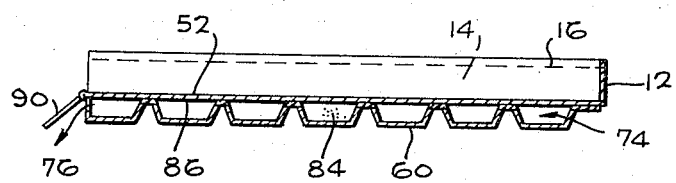
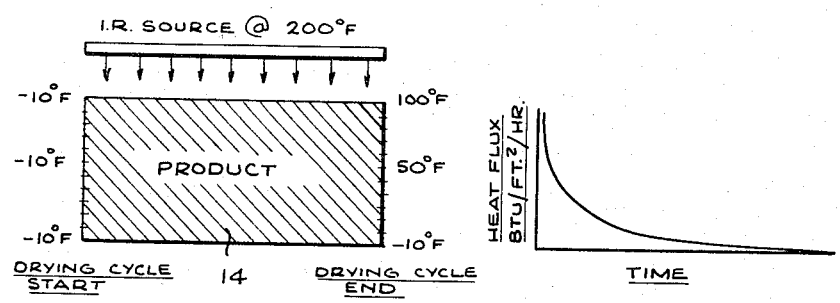
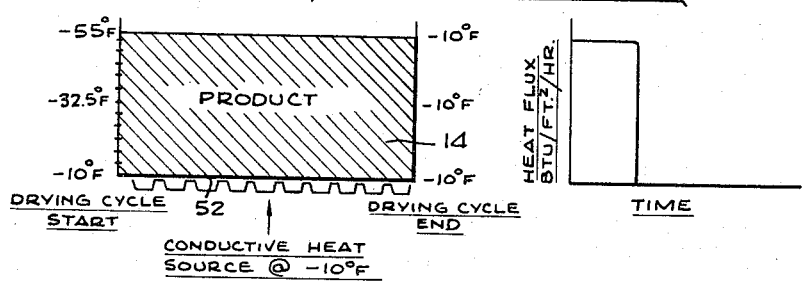
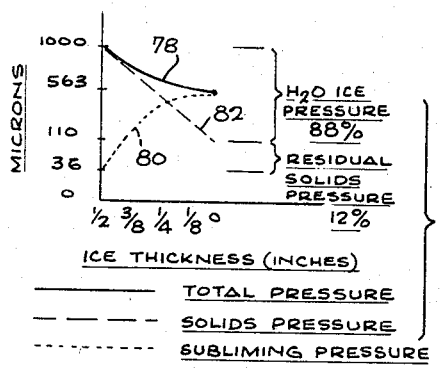
LUIS A. HERNÁNDEZ, JR.
INVENTOR
BY Allan M. Shapiro
ATTORNEY United States Patent Office 3,376,652
Patented Apr. 9, 1968

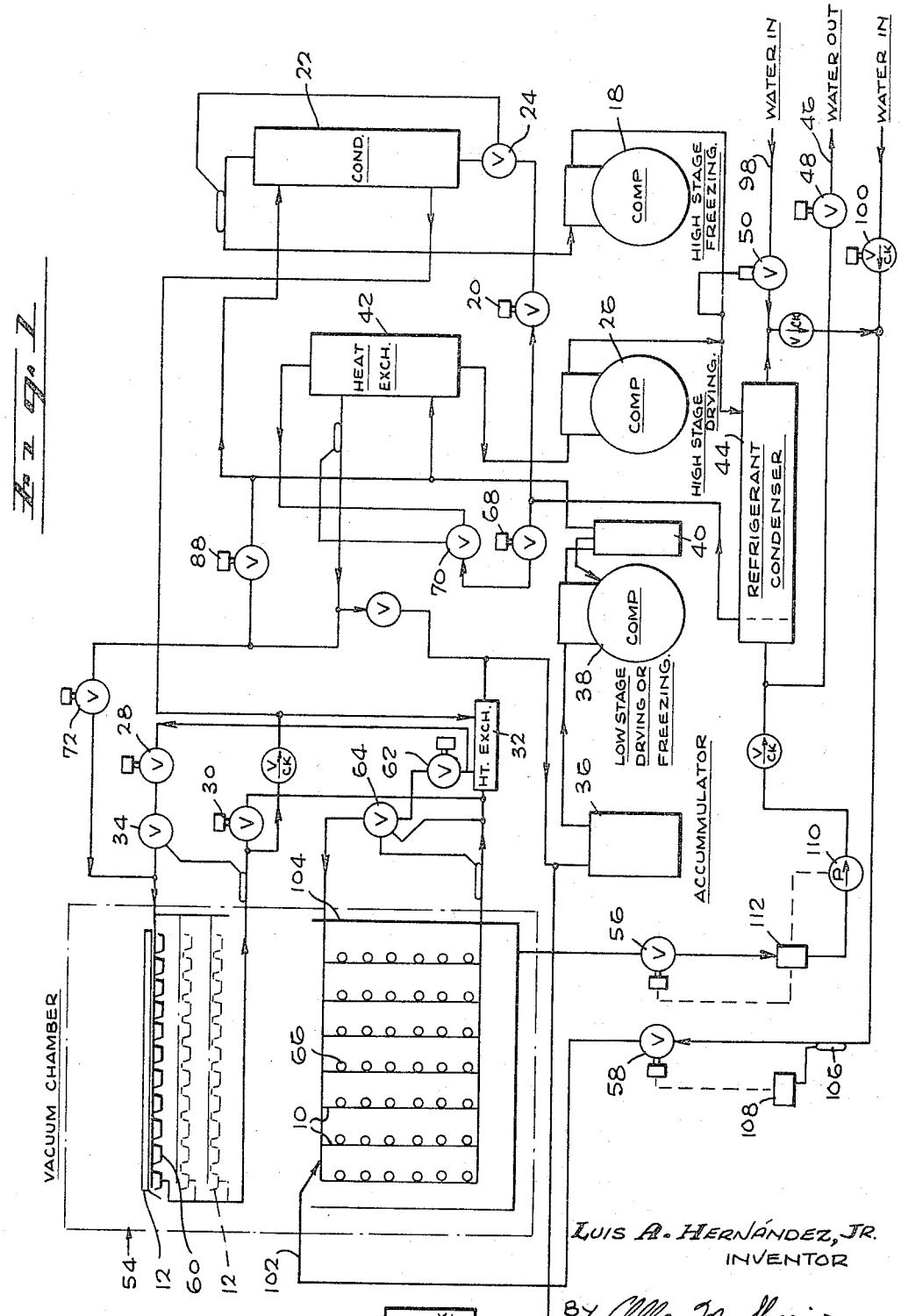

3,376,652
LOW TEMPERATURE FREEZE DRYING PROCESS
AND APPARATUS THEREFOR
Luis A. Hernandez, Jr., Los Angeles, Calif. (6227 Laurel
Grove Ave., North Hollywood, Calif. 91606)
Filed June 17, 1966, Ser. No. 558,345
7 Claims. (Cl. 34—5)

ABSTRACT OF THE DISCLOSURE

Process for vacuum freeze drying a frozen product in a tray with a heat source conducting heat to the product through the tray. Solid state continuity is maintained between the frozen product bottom surface and the heating tray upper surface, which surfaces constitute a heat transfer interface for maximum heat transfer by the heat conduction mechanism solely, such continuity being obtained by effectively but non-mechanically causing the frozen product to be pressed down on the tray. Subliming is performed under conditions whereby the sum of the subliming vapor pressure at the upper exposed or subliming surface of the frozen product and the pressure at the interface due to the weight of the product, such summed pressures being effectively downward at the interface, always exceeds the magnitude of the subliming vapor pressure which could occur at the interface, which occurrence could cause vapor to exist at the interface and break the solid state continuity at the interface. Relatively low temperatures are employed for both the frozen product and the heat source, but with large temperature differences across the product thickness for maximum heat transfer to the subliming surface, resulting in minimized drying time.

The present invention relates to freeze drying and, more particularly, to a freeze drying process wherein a water-containing product is frozen and then heated in a vacuum chamber for sublimation of the water from the frozen product and wherein the sublimed water vapor from the product is condensed and frozen into ice particles.

As a general matter, the freeze drying process is particularly adapted for use in removing water from articles such as food products and pharmaceutical-biological products by the form of evaporation known as sublimation wherein the water passes directly from its frozen state (hereinafter called "ice") to the vapor state without passing through the liquid state because, except for removal of the water, the basic properties of the products are unchanged by such a drying process. The process is carried out in a sub-atmospheric pressure chamber, commonly known as a drying or vacuum chamber, and the water vapor resulting from the sublimation process must be removed to maintain the vacuum in the chamber as well as to prevent the ice in the frozen product from passing through the liquid state or phase. Products thus frozen and dried can be reconstituted by the addition of liquid water and thereby will retain substantially all of their original qualities.

In freeze drying, past experience has indicated that, other applicable parameters being adequately controlled in accordance with known techniques, the rate of sublimation depends solely on the rate of heat input onto the subliming surface, i.e., the rate of sublimation is proportional to the rate of heat input. Accordingly, the method of heat transfer to the subliming surface must be the prime consideration in any freeze drying system. Since heat transfer may be accomplished in only three manners, that is, by convection, radiation or conduction, the following comparison of such three methods may prove helpful in understanding the present invention and the advantages and objectives thereof.

By virtue of the fact that freeze drying is conducted in a vacuum, heat transfer by convection is eliminated as a practical means for causing sublimation because of the absence of heat-carrying air particles or other convection current heat carriers.

With respect to the radiation method, microwave radiation as a heat input means in freeze drying has been successfully employed and is being improved constantly by a number of experimenters. However, even at its theoretical maximum of performance, this method has the inherent disadvantage of any indirect means for accomplishing an end result. Microwave equipment, apart from being an addition to an otherwise simple system, is costly and its operation is expensive. While indirectly and partially employing a conduction mechanism through the frozen portion of the product, since microwave radiation causes heating of a product core or center whereupon the heat from such center is then transferred to the ice front or subliming surface by conduction through the frozen portion of the product, it requires rather elaborate control instrumentation in order to prevent product damage. Microwave radiation flux at any point in the product is a function of the dielectric constant of the product and if, for example, a single ice crystal is allowed to thaw in the frozen core, the product can be easily spoiled; i.e., due to the difference in dielectric constants between ice and water, a water droplet will absorb energy at a faster rate than the adjacent frozen mass, thus increasing its heat content enough to melt more of the surrounding ice. Such melting process then continues at an accelerating rate. In addition, numerous problems have arisen in the nature of scorching of the product, i.e., by electric arcing, one electric pole being the dried product surface.

In some radiation freeze drying systems of the prior art wherein indirect conduction occurs, heat is radiated or otherwise applied onto the exposed upper surface of the frozen product so that, initially or at the beginning of a cycle, sublimation takes place directly from the exposed ice front without passing through the product and, conversely, heat is applied directly to the ice front without conduction through the product or otherwise. However, almost immediately subsequent to initial sublimation and of increasingly harmful and inefficient effect, the heat applied to the ice front (which is now below the surface of the product) is conducted through the already dried product so that such dried product acquires an increasingly high temperature and, conversely, the sublimated vapor from the ice front must pass through the dried and heated product layers resting upon the ice front with a resulting loss in the overall thermal efficiency due to superheating of the evolving water vapor, as explained hereinafter. Freeze driers designed for infrared radiation heating are presently the most popular type. Heat input is accomplished by heated shelves radiating infrared energy onto the product. If the product is placed in trays on these heated shelves, shelf temperature must be programmed for low levels, 200° F. being the approximate maximum allowed to prevent thawing of the product in contact with the tray bottom. That is, if the shelf is at a sufficiently high temperature, only loose contact between the shelf and tray will prevent product water melting at the interface, radiation heating taking place between plate and tray bottom. However, there are bound to be some points of contact between the tray and plate metal surfaces resulting in high thermal fluxes at those points or areas. As a result, "puffing," the seemingly ever-present "devil" in conventional freeze drying, occurs as water vapor evolves through the melted spots. A poor quality product is the consequence as a portion of the drying is by evaporation instead of being totally by sublimation, that is, by freeze drying.

When the product is suspended between the heated shelves so that heat is radiated onto an exposed product surface, higher temperatures are employed in order to supply the increased energy flux required, such flux being a fourth power function of the difference between the absolute temperatures prevailing at the ice front and the heating surface. However, maximum shelf temperatures of only about 300° to 350° F. are permissible even in this case for various reasons. For example, during the initial drying stage, sublimation rates are high until the dried layer becomes thick enough to constitute an effectively opaque shield to infrared radiation. Due to the high emissivity of the dried product and its conversely high absorptivity, it absorbs energy easily and, if it were not for the cooling effect of the sublimed vapor evolving through the dried layer, such dried layer would become substantially as hot as the heating plate. However, the evolving vapor itself becomes superheated, thus imposing unproductive loads on the water condenser refrigeration system and, of course, lowering the overall performance of the system. As drying proceeds further, the dried layer gets thicker and progressively more opaque to infrared radiation until the radiant heat flux at the ice front drops to only a small fraction of the initial flux. Due to the fact that thermal conductivity of most dried products is less than one-hundredth of that of ice, actual flux by conduction through the dried portion is extremely small despite the large temperature gradients which prevail during the final drying stage. Heat flux by direct radiation must cease to be effective when the so called "falling rate" of drying takes place, with re-radiation from dried molecule to dried molecule down to the ice front becoming the dominant means or mechanism of heat transfer until the end of the cycle, thus accounting for the logarithmic curve on the heat flux versus time coordinates as shown in FIGURE 3 of the drawings attached hereto. A further disadvantage to the prolonged drying time and energy wasted in vapor superheating is the impairment of the product at the outer layer or layers which results as the temperature must be allowed to rise to levels which are so high as to vaporize product esters and other flavors and aroma constituents which finally condense along with the water vapor or are exhausted through the vacuum pump as non-condensables.

Thus, there remains for consideration the system of heat transfer employing the direct conduction method. As used hereinafter, the term "conduction" is meant in a direct sense and is not to be confused with those elements of indirect conduction resulting from the use of infrared radiant or microwave radiant heat wherein the application of heat to an ice front may occur by conduction via an already partially or even completely dried portion of the product. As will become most clear hereinafter, conduction is the most efficient means of transferring heat to a subliming surface, that is, conduction in accordance with the present invention from the heat source directly through the frozen product to the subliming ice front without any intermediate interruption or mechanism, such efficiency being due to the relatively high heat conductivity of ice as compared to the conductivity of dried product, e.g., about 100:1. At this point, it should be noted that the term "ice" refers to water in the frozen state. Obviously, however, because of the nature of the art in which the present invention is applied, the term "ice" (where the context requires) also should be understood to include a frozen product wherein solid particles of non-water materials are intimately included and associated with the frozen water since it is the primary purpose of this art to eliminate the water from food and similar substances.

The features of the present invention which are believed to be novel are set forth with particularity in the appended claims. The present invention, both as to its organization and manner of operation, together with the objects and advantages thereof, may best be understood by reference to the following description, taken in connection with the accompanying drawings, in which:

FIGURE 1 is a diagrammatic illustration of apparatus in accordance with the present invention for practicing the process of the present invention;

FIGURE 2 is an enlarged diagrammatic sectional view of a product tray and its associated refrigerant coil illustrated in FIGURE 1;

FIGURE 3 is a diagrammatic illustration, partly in graph form, of an infrared radiation type of prior art freeze drying system;

FIGURE 4 is a diagrammatic illustration, similar in aspect to FIGURE 3, in accordance with the present invention; and FIGURE 5 shows a graph of pressure versus ice (frozen product) thickness as achieved by the present invention.

Unlike freeze drying methods presently in use, the present invention attains much higher rates of heat transfer by conduction through the frozen product from the heat source to the subliming surface. Thus, freeze drying cycles of about one-third to about one-fourth the time duration of the customary cycles are attained without danger of product thawing or deterioration of the final dried product, and constitute the primary objectives of the present invention.

In accordance with the present invention, the temperature of the heat source has been discovered to cause optimum conditions when maintained at approximately −5° F. to −15° F. Ice at −5° F., for example, has a vapor pressure of about 737 microns Hg. This pressure is below the pressure exerted by a frozen product of approximately one-half inch thickness undergoing drying by sublimation, such pressure being approximately 930 microns, or about 0.018 pound (per square inch), corresponding to the weight of an originally one-half inch thick unfrozen product with a density close to unity. The sublimation pressure at the initial ice front being about 52 microns, corresponding to about −50° F., the net pressure exerted on the effective interface between the product and heat source is about 982 microns, i.e., the sum of 930 and 52 microns, or 245 microns higher than the vapor pressure of the product of 737 microns at such interface. This differential pressure of 245 microns is adequate to keep the frozen product tightly against the heat source surface in order to assure the intimate contact required for optimum heat conduction. Otherwise, any vapor formation would break the solid state continuity so that the desirably high heat transfer by conduction would no longer take place. However, as will be further pointed out later, while product thickness versus its temperature difference vary linearly in direct proportion, subliming vapor pressure increases exponentially with an increase in temperature, reference being made to FIGURE 5 showing water vapor or subliming pressure, solids gravity-pressure, and their total pressure plotted on pressure versus ice thickness coordinates. By this chart, the optimum range of subliming temperatures between —5° F. and —15° F. becomes apparent. While the exampled interface temperature of —5° F. is enough to allow a theoretical 245 microns of pressure differential to keep the product in intimate contact with the tray at the beginning of the drying cycle, as the product thickness falls to ¼ inch, theoretically, the summation of the subliming pressure of, say, 208 microns (at —27.5° F.) plus the product gravity pressure of approximately 465 microns or 0.009 lb./in.² equals only 673 microns which is less than the vapor pressure of 737 microns at the plate-product interface. At this condition, a separation of the product from the plate would take place. Nevertheless, as the product thickness decreases still further to zero, the combination of the gravity pressure of the solids plus the exponentially increasing pressure at the subliming surface becomes greater than that of the product-plate interface pressure. A theoretical temperature threshold of approximately —13° F. would be necessary at the interface to prevent any product-plate separation. In practice, molecular adhesion of the product to the plate and, to a certain extent, the shear strength of the product slab acting on the side walls of the plate seem to help under these conditions. For various products, it has been found that a product-plate interface of —5° to —15° F. is adequate. Of course, simple programming of this interface temperature between these levels could be carried out if proven to be economically advisable in order to increase the overall heat flux. Otherwise, a preset temperature between —5° and —15° F. should be used to suit the different products, a practical average being —10° F. Heat input into the product at these temperature levels may be accomplished by direct electric resistance heating of the product tray bottom, by circulating heat transfer fluids in passages attached to the product tray bottom, or by the preferred "heat pumping" method described hereinafter which attains the highest possible overall coefficient of performance.

Under the conditions in accordance with the present invention, a heat flux of approximately 10 B.t.u.'s per hour per square inch (depending upon the water content of the product) can be obtained between the heat source surface and the subliming surface. This value can be obtained by computing in accordance with the following formula:

$$Q = \frac{U \times TD \times A}{L}$$

where:

$Q$ = the amount of heat to be transferred.
$U$ = 0.134 (conductivity of ice at —30° F. in B.t.u./hr./ ° F./in.²/in. (—30° F. is a mean product temperature during the cycle).
$A$ = unit area (1 sq. in.).
$L$ = thickness of frozen product in inches (½″ thickness in this example).
$TD$ = initial temperature differential between surfaces of frozen product (45° F. in this example; i.e., —10° F. to —55° F.).

resulting in a value of Q of 12.0 B.t.u./hr./in.². If the solids content of the product is, say, 12% as shown in FIGURE 5, the heat flux is of the order of approximately 10.56 B.t.u./hr. (12.0×.88) per sq. inch, by far the highest coefficient of heat transmission ever achieved in the art of freeze drying by at least a ratio of 4 to 1, other quality parameters being equal.

As a result, a frozen product which, in its original liquid state, was approximately one-half inch thick, can be adequately freeze dried in approximately two hours or even less as compared to about six to twelve hours or even longer by means of conventional methods. The freeze drying time required by the method of the present invention can be determined in accordance with the following calculations:

With the heat of sublimation averaging about 1200 B.t.u./lb., heat flux being 10.56 B.t.u./hr., weight of water equal to 88% of 0.018 lb./in.² or 0.01584 lb. approximately, then:

$$\text{Time} = \frac{1200 \text{ B.t.u./lb.} \times 0.01584 \text{ lb.}}{10.56 \text{ B.t.u./hr.}} = 1.80 \text{ hrs. approx.}$$

In accordance with another aspect of the present invention, there is provided a preferred embodiment of a process and apparatus therefor whereby the low temperature heat input and condensing and defrosting cycles are attained for accomplishing the foregoing aspects of the present invention, such process being designated as "heat pumping." In accordance with this aspect of the invention, an initial thermal "bank" is created by freezing the product in the freezing-sublimation trays as by direct expansion of a low temperature refrigerant such as, for example, the type commonly known as R–13, in the coils or passages adjacent to the bottom of the trays. Then, under vacuum, this frozen product serves as the heat sink for the same refrigerant in the same coils during a condensing phase wherein the refrigerant is supplied at a high pressure at approximately —15° to —5° F. Such low temperature refrigerant, at such low stage, expands in the water vapor condenser coils or plates at a temperature low enough to give an initial condenser surface temperature of approximately —65° F. Accordingly, the heat pumped to the product tray coils, now serving to furnish the necessary heat of sublimation, equals the heat of condensation extracted by the water vapor condenser coils or plates, thereby constituting a balanced low temperature refrigeration cycle, except to the extent of unbalance created by the heat of compression and other minor losses which can be readily counteracted or effectively removed by a cascade system employing a high temperature refrigerant (high stage) such as ammonia, R–12, R–22, R–502, and so forth, thus furnishing properly de-superheated high pressure vapor of the low temperature refrigerant to the product tray coils for its final condensation.

Still further, once the product has been freeze dried, the necessary heat of fusion plus some sensible heat for defrosting the ice at the water vapor condensing plates is supplied by the necessary portion of water used to carry away the heat of condensation of the high temperature (high stage) refrigerant, accomplished by flooding or spraying the thus heat-laden water over the ice bank which has been formed on the water vapor condensing plates and recirculating such water as required. This latter operation is therefore performed simultaneously with the freezing of a new product batch in the manner described hereinabove. Thus, a new cycle commences and advantage is taken of the "bank" of ice available as a heat sink at both ends of the heat pump cycle.

Referring to the drawings, a complete cycle of operation of apparatus in accordance with a preferred embodiment of the invention will be described as a means of further explaining the process of the present invention.

At the start of the initial freezing cycle, as differentiated from subsequent cycles where an ice bank has been built onto the water vapor condensing plates 10, all valves are in their normally closed positions and all motors and actuating devices are inoperative. The tray 12 is filled with the liquid product 14 to a desired operating level 16 which, for example, may generally be one-half inch in depth or to any other depth which may be appropriately adequate for particular fluids and solids in accordance with the principles of the present invention. The high-stage compressor 18 and a solenoid valve 20 are turned on to cool the cascade condenser 22 to the operating temperature, preferably between 10° and —10° F. depending upon the mechanical design. High stage liquid refrigerant now flows through expansion valve 24. By means of a switch (not shown) of either a temperature or pressure sensing type at the low stage high pressure inlet to the cascade condenser 22, the low stage compressor 38 is automatically turned on when a predetermined low-stage condensing temperature or pressure (saturated refrigerant vapor under static condition) has been achieved. Simultaneously, a pair of solenoid valves 28 and 30 are turned on, allowing low-stage liquid refrigerant from the cascade condenser 22 to flow through the liquid-to-suction heat exchanger 32, the first solenoid valve 28, and a thermostatic expansion valve 34 where pressure is reduced from about 130 to 190 p.s.i.g. (pounds per square inch gauge) to any low-side pressure which may range from 0 to approximately 50 p.s.i.g. The low pressure refrigerant is evaporated by the sensible and latent heat of fusion of the product load and flows through the second solenoid valve 30, the suction side of the heat exchanger 32, and the accumulator 36 where any excess saturated liquid is trapped and slowly metered out, and to the low stage compressor 38 where refrigerant vapor is compressed, passed through the oil separator 40 and fed again to the cascade condenser 22 where high pressure super-heated low temperature refrigerant vapor is liquified to a saturated condition and passed through the liquid-to-suction heat exchanger 32 where this liquid is sub-cooled by the low temperature (−50° to −90° F.) suction vapor. The foregoing cycle is continuously maintained during the product freezing portion of the operation.

The product's sensible and latent heat, the low stage heat of compression, and the transmission heat gains are rejected at the cascade condenser 22 where the high-stage "freezing" compressor 18 pumps this heat onto the high-stage refrigerant condenser 44 for transfer to its cooling water which is discharged at 46 through a valve 48. The inlet water valve 50 is regulated by the high-stage discharge pressure and meters the flow of cooling water to maintain a predetermined constant high-stage refrigerant condensing temperature in accordance with the prevailing ambient conditions relative to the cooling water, such ambient conditions including the temperature and cost of the available water as supplied by the local water utility. Regarding cost, it may be noted that, if water is expensive, then the compressor is used to pump at a higher compression ratio for causing a greater temperature differential through the water, thus using less water but more power for compression to achieve the same effect.

Once the product has been duly frozen to a temperature of approximately −60° F. at the product-tray interface 52 as determined, among other means, by a predetermined pressure drop in the low stage suction as may be caused by a small product load, i.e., a small amount of sensible heat consisting of the difference between low-stage evaporating temperature and frozen product temperature, the product freezing cycle is about to be terminated. As will be clear to those skilled in the art, other means for detection of completion of the product freezing cycle or otherwise may be employed to automatically initiate the next cycle or portion of the operation.

After completion of the product freezing portion of the operation, the vacuum chamber 54 is ready to be evacuated for the next portion of the cycle. A pair of solenoid valves 56 and 58 are closed as well as the product filling (in case of liquid product) and vent valves (not shown) and all other apertures so as to isolate the chamber 54 from the atmosphere, and the vacuum pump (not shown) is started. Once the chamber pressure has been reduced to approximately 5 to 10 torr, solenoid valve 28 is closed to stop the low stage liquid refrigerant flow to the product tray coils 60 and, simultaneously, another solenoid valve 62 is opened to divert such liquid refrigerant to an expansion valve 64 and to the coils 66 of the water vapor condensing plates 10 where the refrigerant is evaporated internally, thus causing any remaining water vapor in the chamber 54 to freeze out on the external surfaces of the water vapor condensing plates 10. This step prevents water vapor migration to the vacuum pump since the temperature of the condensing plates is lower than that corresponding to the total chamber pressure. As a result, evacuation time is shortened because the vacuum pump does not have to handle water vapor. This step also serves to pre-cool the condensing plates 10 for the next cycle or portion of the freeze drying operation. A few minutes before the next cycle is initiated, another solenoid valve 68 is opened to permit the feeding of high-stage liquid refrigerant to an expansion valve 70 and thus to the heat exchanger (or desuperheater) 42, thus pre-cooling the heat exchanger 42 to its operating temperature. Evacuation is continued until the chamber pressure has been reduced to a proper level of approximately 500 to 30 microns, the proper vacuum level depending upon various parameters as will be clear to those skilled in the art such as, for example, product thickness, the thermal diffusivity of the product, and other design factors.

As soon as the appropriate vacuum has been achieved in the chamber 54, the low temperature heat pump freeze drying cycle portion of the complete cycle in accordance with the present invention is initiated by turning off the solenoid valve 20 which has been feeding high-stage refrigerant to the cascade condenser 22, turning on the solenoid valve 72 to start feeding low-stage saturated vapor to the coils 60 of the product trays 12, and turning off solenoid valve 30 to divert the condensed liquid refrigerant to another solenoid valve 62 which is turned on simultaneously so as to feed the condensed liquid refrigerant through the expansion valve 64 to the coils 66 of the water vapor condensing plates 10 wherein the liquid refrigerant evaporates. All of the foregoing steps are accomplished simultaneously and, at the same time, the high-stage "drying" compressor 26 is turned on and the high-stage "freezing" compressor 18 is turned off. Thus, in accordance with the present invention, a −5° to −15° F. low-stage saturated refrigerant vapor is delivered at a corresponding pressure of approximately 150 p.s.i.g. to 123 p.s.i.g. by the heat exchanger 42 to the product tray whereupon such refrigerant vapor is condensed at a temperature which is uniform throughout the entire bottom surface area of the tray 12, thereby affording uniform rates of sublimation of the product. It is important to note here that such uniform rates of sublimation constitute an important distinction over the effects achieved by the methods of the prior art such as, for example, the utilization of sensible-heat types of heat transfer media which inherently require and are subject to the disadvantages of a temperature difference in the media between its inlet and outlet ports indicated at 74 and 76. The condensed low-stage refrigerant is now fed in its liquid state into the water vapor condensing plates where it is evaporated at approximately −70° F., resulting in an initial water vapor condensing temperature of about −66° F. on the outside surface of the water vapor condensing plates, assuming normal refrigerant film factors. The outer surface of the condensing plates thus being lower in temperature than the surface of the frozen product, the water vapor evolving from the latter is condensed on the surfaces of the former.

As a typical example, with a product-tray interface temperature of approximately −10° F., and with a temperature difference across the frozen product (i.e., between the exposed surface 16 of the product 14 and the product-tray interface at 52) of approximately 45° F. at the start of the cycle for a normal frozen product (i.e., containing approximately 88% water), the sublimation temperature is approximately −55° F. saturated, corresponding to about 36 microns of water vapor pressure. In accordance with the Napierian equations for adiabatic gas flow, a 55% pressure difference results in the maximum possible rate of flow of water vapor as it evolves from the frozen product 14 to the surfaces of the water vapor condensing plates 10 and, accordingly, a condensing plate temperature of about −65.5° F. (equivalent to about 19 microns of pressure) achieves such maximum flow rate. As sublimation proceeds, the temperature difference across the product 14 decreases linearly with the decrease in the remaining thickness of the frozen product, with a correspondingly linear rise in the subliming temperature. Conversely, as the ice on the condenser 10 increases, the temperature difference across such frozen condensate will also increase linearly for all practical purposes since the frozen product and the condensate ice are roughly of the same density in the typical case of the normal product having about an 88% water content. However, as the fundamental parameter of the present invention, as previously explained, the corresponding subliming pressure increases exponentially. Thus, while at the beginning of the cycle the subliming pressure is about 36 microns corresponding to about −55° F., the subliming pressure rises to about 563 microns corresponding to about −10° F. at the end of the cycle when the last film of product ice is subliming; thus, for an increase in absolute temperature equivalent to only about 10.5%, the subliming pressure increases by more than 1500%, i.e., over an entire order of magnitude.

Referring again to FIGURE 5 particularly, it is seen that the total pressure 78 or sum of the subliming pressure 80 plus the product pressure 82 (both frozen and dry product) such additive pressures being effectively at the product-tray interface 52, must be higher than the vapor pressure of water at the product-tray interface at any and all times during the freeze drying cycle. Thus, if the interface vapor pressure is 563 microns, the sum of the subliming pressure and the product gravity pressure must be higher than 563 microns in order to maintain intimate molecular contact between the product and its tray so as to assure true conductive heat transfer between the heat input surface for the condensing refrigerant and the product subliming surface which, as explained before, is the ice front.

In other words and referring to FIGURE 2, with the foregoing described interface pressure relationships, the only heat transfer mechanism occurring is that of true conduction, and such heat flow occurs in an uninterrupted manner from the refrigerant 84 (which is continuously supplied in a vaporized state under pressure and continuously condenses as its heat is transferred, thereby functioning as a heat source rather than as a "refrigerant" in the common and usual sense), to the refrigerant coil surface and the bottom of the tray 86, thence through the product-tray interface 52 and, finally, through the frozen product 14 to the latter's ice front (at 16 initially) which constitutes the subliming surface.

For an average product with an approximately 88% water content, approximately two hours or less is required for the freeze drying portion of the cycle to remove by sublimation all but a trace content of moisture from an initially one-half inch thick frozen product by the practicing of the present invention.

It may be noted, however, that even lower than normally acceptable moisture trace contents can be achieved further in accordance with the present invention by next employing a "hot gas" drying cycle. For so doing, a refrigerant vapor, superheated as by compression to about 120° F., is supplied to the refrigerant coil 60 instead of the −10° F. saturated vapor. Thus, by opening a solenoid valve 88, such superheated vapor provides sufficient heat to the product-tray via the refrigerant coil 60 to bring the final product to thermal levels somewhat higher than those achieved by normal "dry-bulb" packaging temperatures, bearing in mind the product's extremely low relative humidity. Whether such "hot gas" cycle is used or not, desired termination of the freeze drying portion of the total operational cycle is indicated by a substantial lowering of the low stage suction pressure so as to trigger-initiate the various necessary termination functions. For further explanation thereof, note that very little low stage high pressure vapor will be condensed during the terminal portion of the cycle (due to the very low overall heat content of the dry product) so that the suction pressure at the low stage compressor 38, due to the small amount of liquid refrigerant being condensed in the refrigerant coil 60 at the product-tray 12, will drop to a predetermined level, thus signifying that freeze drying has been accomplished and the functional performance thereof should be terminated. Accordingly, the compressors 38 and 26 as well as their supporting accessories are turned off and, while preferably still under vacuum, the dried product is removed from the tray 12 as by lowering a gate 90 and causing the product to be scraped out by other means not shown. Then the vacuum is broken with either dry air or dry nitrogen and the product is ejected or otherwise removed from the chamber 54 to conveyors or other mechanism or else directly to immediate packaging facilities.

As soon as the dried product is removed from the chamber 54, a defrosting cycle is placed in operation by opening the solenoid valve 58 between the water supply line 98 via a check valve 100 and a distributing tube 102 whereby water is distributed over the water vapor condensing plates 10 and coils 66 until their tank 104 is flooded so that all of such plates are completely submerged in water so that the ice thereon is completely melted therefrom. Concurrently, the liquid product filling valves (not shown), in case of liquid products, are opened to fill the product-trays 12 to initiate another product freezing cycle as described hereinabove, although, this time an ice bank at the water condensing plates 10 is available to serve as the heat sink for the product freezing-heat pumping portion of the cycle which is effected simultaneously with water condensate defrosting phase.

Thus, this other half of the complete cycle of the present invention, that is, product freezing condensate defrosting is also regenerative in nature as is the subliming-condensing portion of the cycle which accounts for the unusually high coefficient of performance. However, there are thermal losses in this defrosting-product freezing phase also. Since in this phase the heat from the product is pumped through both low and high stages, instead of the low stage only as in the subliming-condensing portion, two heats of compression plus their dynamic heat gains must be rejected to balance the system. Furthermore, due to the fact that some moisture is allowed to remain in the dried product, the ice bank at the water condensing plates 10 contains that much less ice to serve as the heat sink for the incoming product to be frozen.

Accordingly, the ice bank at plates 10 does not have enough latent and sensible heat to take care totally of the freezing thermal requirements of the incoming product. As a result, only approximately two-thirds of the required total product freezing time, which is about one-sixth of the total drying time, will be in a closed cycle with water circulating only between flooding tank 104 and the high stage refrigerant condenser 44, that is, until all ice at the water vapor condensing plates 10 has melted and enough sensible heating of the defrosted-defrosting water has been achieved. As the ice is melting, water above 32° F. will be supplied to the condenser 44 where, depending on the design, a predetermined rise in temperature will occur, enough to have an adequate high stage condensing pressure. When thermostat 108 by means of its sensor 106 detects a temperature rise to a level approximate to that of the outside water supply, thermostat 108 closes solenoid valve 58 and opens solenoid valve 48 thereby draining flooding tank 104 until float valve 112 detects drainage completion, thereby stopping water pump 110. Since a no-flow condition exists now at condenser 44, a predetermined small increase in refrigerant condensing pressure will result until pressure-regulated water valve 50 senses such an increase and opens to admit water from supply line 98 to condenser 44, water valve 50 now maintaining a slightly higher condensing pressure with outside water supply. This phase of the product freezing cycle will continue until the product is properly frozen and will be terminated in such a manner as previously described herein. Thereupon all the foregoing operations of the overall cycle may be repeated.

It should be understood that the heat pump cycle of the freeze drying phase has been described hereinabove under idealized conditions since the differences between actual and idealized conditions can be readily taken into account by those having skill in the art upon an understanding of the present invention. Such differences relate primarily to losses like entropy, dynamic and general thermodynamic losses along with heat transmission losses due to the temperature differentials between, say, the subliming temperature and the temperature of the surrounding chamber as well as the changes in temperature of the condensing plates and their surroundings. Also, of course, there will be heat gains (or losses, depending upon the aspect) along the refrigeration lines. By compensating for such operational and ambient parameters of the actual conditions, the idealized condition can be attained. For example, a small cascade condenser operating in parallel with the desuperheating heat exchanger 42 that supplies saturated vapor to the subliming coil would supply liquid refrigerant in addition to that supplied to the subliming coil where the saturated vapor is condensed into liquid. Assuming that the net loss due to all of the foregoing operational and ambient parameters would amount to about 5 or 10% of the total heat pump effect of the subliming heat and the vapor condensing heat absorption, such small cascade condenser would supply the necessary liquid refrigerant to the water vapor condensing plates to compensate for such losses. Such liquid refrigerant could be injected into the vapor condensing plates by means of an expansion valve of the automatic type which maintains a constant pressure and would operate in parallel to the main expansion valve 64 supplying the liquid refrigerant as it comes from the subliming coil. A further function of such automatic expansion valve would be that of providing a constant evaporating pressure which, in turn, would result in a constant temperature at the water vapor condenser plates. Thus, such automatic expansion valve would meter only that amount of refrigerant necessary to thermally balance the heat pump cycle in addition to that supplied by the main expansion valve during the drying portion of the cycle.

Thus, the present invention provides a very high thermal efficiency and overall coefficient of performance exceeding those objectives attainable by other freeze drying methods. In addition, the ultra low temperature employed for freezing the product on the same tray which serves as the subliming heat source surface produces smaller ice crystals in the product, resulting in a superior end product. Still further, the ultra low condensing temperatures result in lower final vapor pressures of the dried product, that is, the final moisture content or trace is lower than that achieved with conventional freeze drying methods while eliminating the customary prolonged period of final drying. Even further, the concepts of the present invention provide the means for employing even lower subliming and/or condensing temperatures for even greater advantages such as larger temperature differences across the product depth for greater heat fluxes, at such time as the state of the mechanical art of vacuum pumps and the chemical art of refrigerants advances so that correspondingly lower overall pressure and temperature levels become more economical than those presently available.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What is claimed is:
1. In a freeze drying process for sublimating ice from a slab of frozen product in a vacuum chamber having water vapor condensation means, the steps comprising:
  freezing the product on a thermally conductive plate to a temperature of approximately −13° F. or lower and in a slab form while at atmospheric pressure, whereby the bottom of the frozen product is in intimate contact with the plate to constitute a product-plate interface and the upper surface of the frozen product is exposed and constitutes an initial subliming surface for water vapor emission;
  generating a vacuum in the chamber; and
  then continuously supplying a source of sublimation heat having the characteristic of a low temperature approximating the temperature of the frozen product at the product-plate interface, such heat source being applied against the surface of the plate opposite to the product-plate interface whereby heat is transferred from the heat source to the subliming surface via the plate, the product-plate interface and the frozen product in solid state continuity successively by heat conduction solely as the subliming surface progresses downwardly due to sublimation therefrom and consequent diminution of the frozen product thickness.
2. The invention defined in claim 1 wherein said low temperature is approximately −10° F.
3. The invention defined in claim 2 wherein said frozen product is approximately one-half inch thick.
4. The invention defined in claim 3 wherein operation of the water vapor condensation means is commenced substantially simultaneously with the generation of the vacuum whereby sublimation commences at the initial subliming surface causing further lowering of the temperature thereof prior to supplying the source of sublimation heat.
5. The invention defined in claim 4 wherein the further lowering of the temperature of the initial subliming surface creates a linear temperature gradient in the frozen product from its subliming surface to the product-plate interface, and the vacuum is drawn to a pressure corresponding to a sublimation temperature of approximately −55° F. at the initial subliming surface.
6. The invention defined in claim 5 wherein the source of sublimation heat is a saturated vapor refrigerant.
7. In a freeze drying process for sublimating ice from a slab of frozen product in a vacuum chamber having water vapor condensation means, the steps comprising:
  freezing the product on a thermally conductive plate to a low temperature of approximately −10° F. and in a slab form approximately one-half inch thick while at atmospheric pressure, whereby the bottom of the frozen product is in intimate contact with the plate to constitute a product-plate interface and the upper surface of the frozen product is exposed and constitutes an initial subliming surface for water vapor emission;
  generating a vacuum in the chamber and substantially simultaneously commencing operation of the water vapor condensation means whereby sublimation commences at the initial subliming surface causing further lowering of the temperature thereof and creation of a linear temperature gradient in the frozen product from its subliming surface to the product-plate interface, the vacuum being drawn to a pressure corresponding to a sublimation temperature of approximately −55° F. at the initial subliming surface; and then continuously supplying a source of sublimation heat having the characteristic of a low temperature approximately the temperature of the frozen product at the product-plate interface of approximately −10° F., such heat source being applied against the surface of the plate opposite to the product-plate interface whereby heat is transferred from the heat source to the subliming surface via the plate, the product-plate interface and the frozen product successively by heat conduction solely as the subliming surface progresses downwardly due to sublimation therefrom and consequent diminution of the frozen product thickness.

References Cited

UNITED STATES PATENTS

| | | | |
|---|---|---|---|
| 1,970,956 | 8/1934 | Elser | 34—5 |
| 2,066,302 | 12/1936 | Reichel | 34—5 X |
| 2,345,548 | 3/1944 | Flosdorf | 34—92 |
| 2,853,796 | 9/1958 | Sanders | 34—92 |
| 3,132,930 | 5/1964 | Abbott | 34—5 |
| 3,243,892 | 4/1966 | Ullrich | 34—5 |
| 3,289,314 | 12/1966 | Porta | 23—5 |

FOREIGN PATENTS 552,821   4/1943   Great Britain.

WILLIAM J. WYE, *Primary Examiner.*